United States Patent [19]

Cole

[11] 3,976,245
[45] Aug. 24, 1976

[54] AUTOMATIC, TEMPERATURE RESPONSIVE DAMPER ASSEMBLY

[76] Inventor: James D. Cole, 6403 Shoalcreek West, Austin, Tex. 78731

[22] Filed: Nov. 24, 1975

[21] Appl. No.: 634,358

Related U.S. Application Data

[63] Continuation-in-part of Ser. No. 482,699, June 24, 1974, Pat. No. 3,921,900.

[52] U.S. Cl. ............................. 236/93 A; 137/601; 236/99 F; 251/251
[51] Int. Cl.² ........................................ G05D 23/02
[58] Field of Search ...................... 98/85, 41 R, 116; 137/601; 236/49, 93, 99; 251/212, 251, 298

[56] References Cited
UNITED STATES PATENTS

| | | | |
|---|---|---|---|
| 75,878 | 3/1868 | Dripps | 236/49 |
| 945,831 | 1/1910 | Westphal | 236/49 |
| 982,229 | 1/1911 | Adair | 236/49 |
| 1,219,893 | 3/1917 | Woolf | 236/49 |
| 1,652,216 | 12/1927 | Replogle | 236/49 |
| 2,157,770 | 5/1939 | Mayo | 236/99 |
| 2,837,991 | 6/1958 | DeRoo | 98/40 D |
| 3,009,473 | 11/1961 | Hennen | 137/601 |
| 3,040,939 | 6/1962 | McCollough | 137/601 |
| 3,147,768 | 9/1964 | Kennedy | 137/601 |
| 3,168,085 | 2/1965 | Stelter | 251/251 |
| 3,342,212 | 9/1967 | Day et al. | 137/601 |
| 3,592,240 | 6/1971 | Hedrick et al. | 137/601 |
| 3,888,166 | 6/1975 | Stottman | 137/601 |

Primary Examiner—William E. Wayner
Assistant Examiner—Ronald C. Capossela
Attorney, Agent, or Firm—Arnold, White & Durkee

[57] ABSTRACT

An automatic temperature responsive damper assembly for use primarily with turbine-type attic ventilators is disclosed. A temperature sensitive power element capable of generating a force in the order of fifty pounds per square inch is positioned beneath the vane or vanes of the damper. The preferred power element is a sealed bellows unit containing the appropriate heat-expansible fluid. Expansion of the bellows with increased heat actuates a pivoted lever to cause opening and closing of the damper over a predetermined range of temperatures. Communication of the lever movement to movement of the damper vane or vanes is accomplished by providing the free end of the pivoted lever with an upwardly extending arm having a vane engaging camming surface. By shaping the camming surfaces in a sinusoidal fashion, a rapid initial opening of the damper is provided as well as protection against damage to the damper assembly should the maximum preset temperature be exceeded.

6 Claims, 7 Drawing Figures

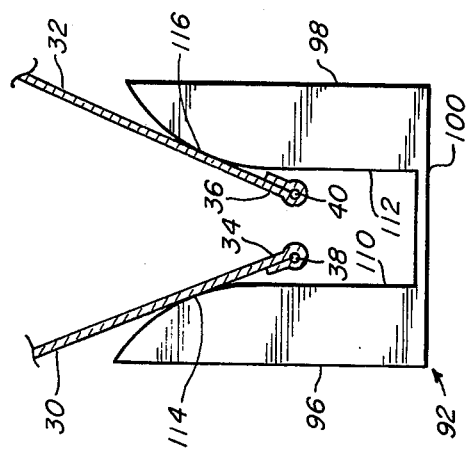
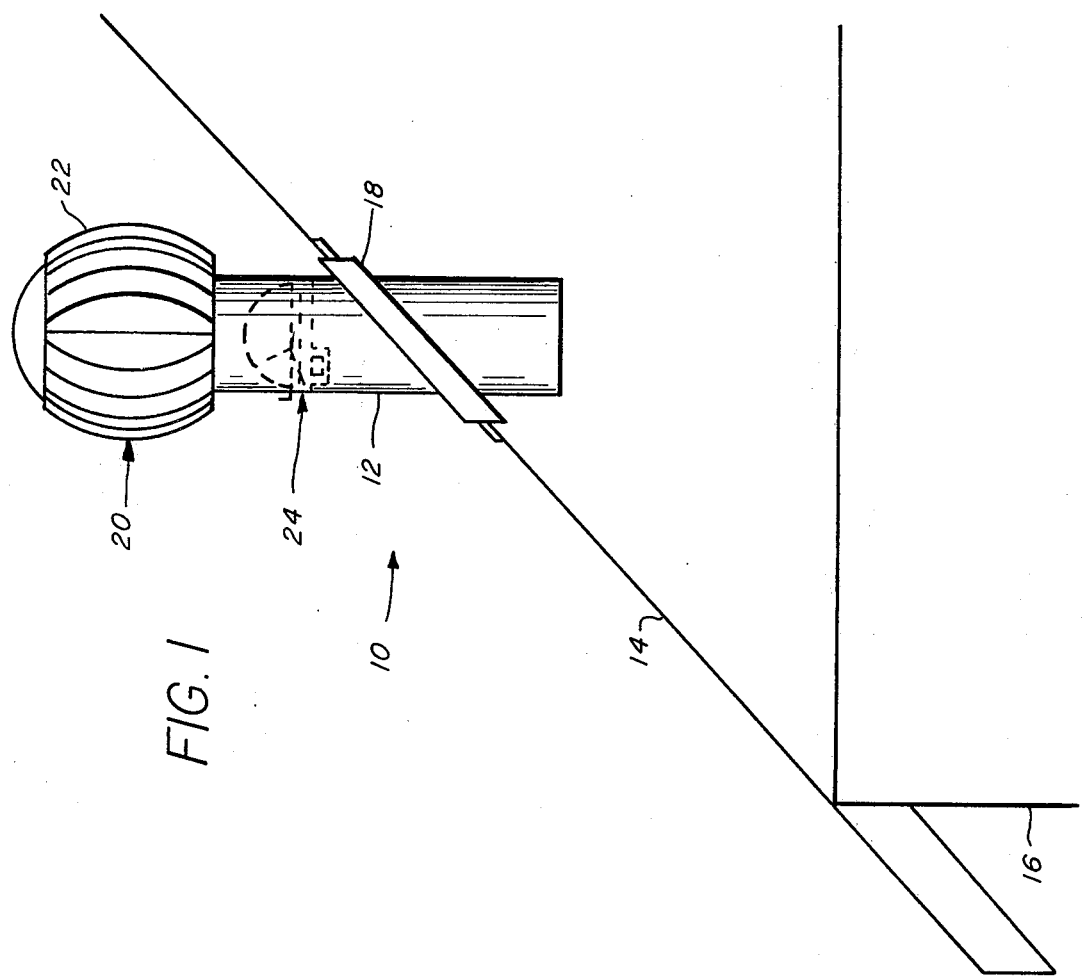

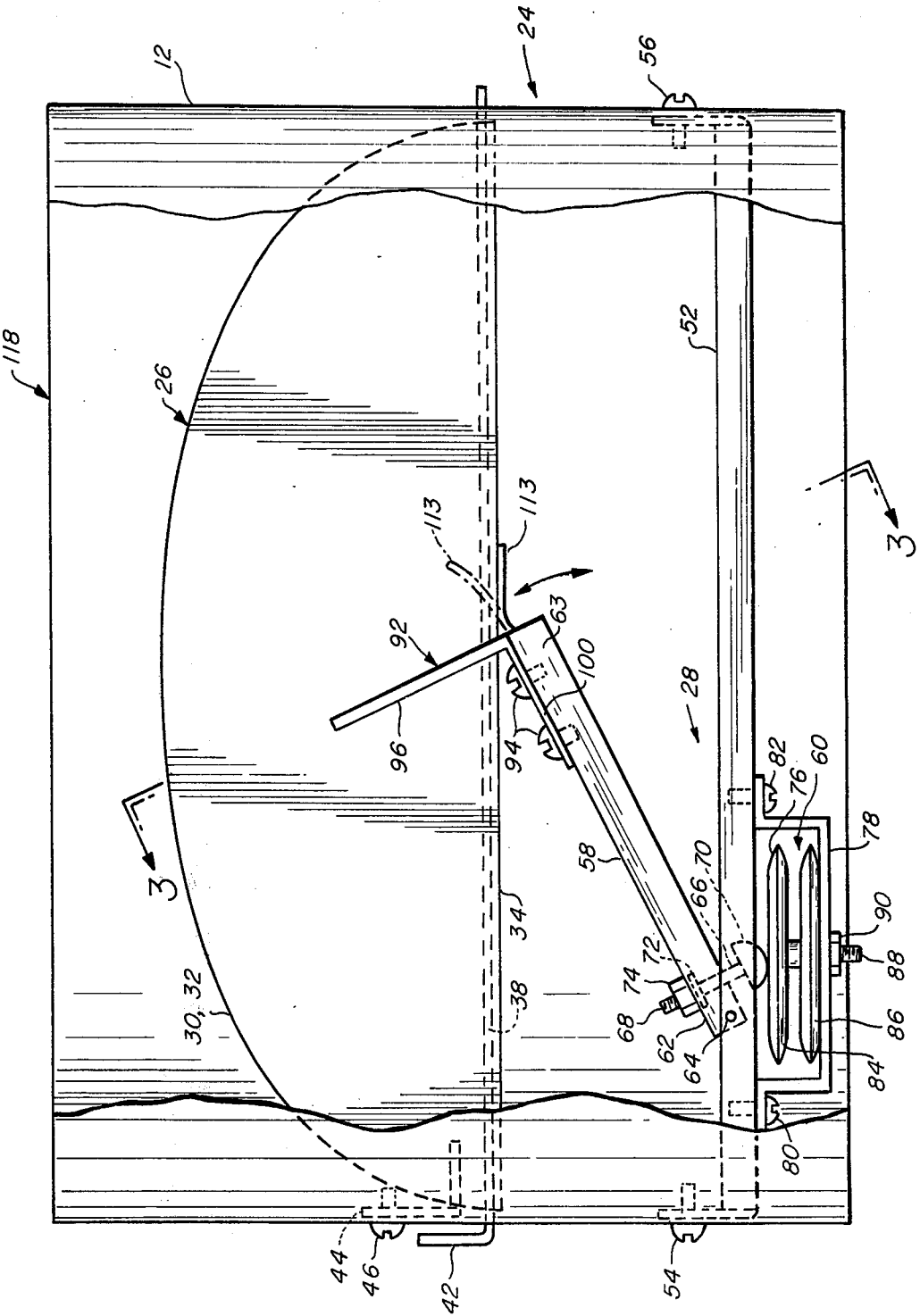

AUTOMATIC, TEMPERATURE RESPONSIVE DAMPER ASSEMBLY

RELATED APPLICATIONS

This application is a continuation-in-part of application Ser. No. 482,699, filed June 24, 1974 now U.S. Pat. No. 3,921,900.

BACKGROUND OF THE INVENTION

1. Field of the Invention

The present invention is directed generally to a ventilation conduit damper assembly for use primarily with a turbine ventilator. More specifically, the present invention is directed to such a ventilation damper assembly provided with automatic, temperature responsive, actuating means whereby the amount of movement of the damper vanes, over a preselected temperature range, is controlled.

2. Description of the Prior Art

Dampers for use in air conduits or ducts are generally well known and are utilized, for example, in connection with stoves, fireplaces, furnaces and the like. Typically a damper assembly will consist of a moveable vane or vanes which are positionable to control the amount of air flow through the conduit within which the damper is placed. In many applications the damper is either normally open or normally closed, with position selection and control being accomplished manually. Dampers are additionally often used in conjunction with the ventilating systems in private homes and other buildings where it is desired to provide a measure of ventilation control.

In some areas of the country where rather hot weather is experienced during at least a portion of the year, it is often desirable to provide a means for ventilating an otherwise confined portion of a building, for example, the attic in a private home, in order to minimize the buildup therein of excessive heat and/or humidity. This ventilation is often provided by the use of a turbine air ventilator of a known type in which wind causes the turbine blades to rotate, producing in effect a pumping action, assisting the air flow out of the area provided with the ventilating conduit.

While turbine ventilation systems are quite effective in promoting air flow, they have, in the past, suffered from the lack of an effective automatic means to control the amount of air removed. Obviously the air flow should be at a maximum during hot weather when the temperature in the area to be ventilated is high, but just as obviously the ventilation should be much less when the temperature in the area to be ventilated is lower. Unnecessary ventilation in periods of cool temperatures may contribute to excessive loss of heat and a consequent increase in heating costs. While this problem of present ventilation systems is recognized, the attempted solutions have been less than satisfactory.

Although some type of adjustable damper is desirable, in a number of instances no such adjustable flow control means has been provided. When a damper is provided, it often is of the type where the position of the damper means is adjustable by, for example, a manual movement of the vanes. Since the space to be ventilated, typically an attic, is often inaccessible, the homeowner is not apt to manually adjust the damper as often as he should to provide for efficient ventilation in hot periods or for retention of heated air during cold periods. Other adjusting means such as chain pulls, elongated adjusting rods and the like have been provided, but again either these are difficult to use or else the homeowner simply forgets to change the damper position. Hence the damper is open when it should be closed or closed when it should be open so that it is ineffectual in performing its intended function. With the increasing cost of power used for heating and air-conditioning, it becomes readily apparent why an automatic damper system should be utilized in conjunction with ventilation systems.

Unfortunately, the few prior automatic adjustable dampers which have been contemplated or manufactured have been unable to perform their desired function in an effective, economical manner. These automatic controls, when available, have suffered from high cost, undependability, a failure to provide simple means to vary the range of temperature over which the damper is controlled, and a propensity to become damaged or disabled in cases of temperature fluctations beyond the range for which they were designed. This lack of dependability, high cost and incidence of damage to the device by abnormal temperature fluctuations has combined to limit the use and acceptance of automatic damper control systems in home ventilating systems and the like.

SUMMARY OF THE INVENTION

The automatic temperature responsive damper assembly of the present invention is comprised first of one or more movable vanes adapted to be mounted inside a ventilating conduit and to pivot therein between a generally closed and a generally open position. A temperature responsive power drive assembly, sensitive to detected temperature changes in the conduit within a predetermined range and capable of generating a force in the range of 50 to 60 psi, is adapted to actuate in response to appropriate temperature changes and move a lever arm. The lever arm is positioned in the conduit and operatively connected between the power drive assembly and the movable vane or vanes to effect closing or opening of the vane or vanes with the appropriate temperature changes. This is accomplished by providing the free end of the lever arm with one or more appropriately shaped extensions, or fingers, for engaging each vane and communicating the movement of the lever arm to the vane. Camming means are provided in association with each vane-engageable extension or finger, so as to permit the movement of the lever to be communicated to the vane in a generally arcuate path so as to provide a non-binding movement of the vane between its open and closed positions.

The damper assembly of the present invention is further comprised in preferable embodiment of a split butterfly vane damper pivotably positioned in the air flow conduit. A temperature-sensitive sealed bellows power unit containing a heat-expansible fluid is positioned below the damper vanes. Density changes of the volatile fluid sealed inside the unit cause the bellows to expand or contract in accordance with temperature changes. A lever is positioned inside the conduit between the bellows unit and the vanes. The lever is pivoted at one of its ends and positioned so as to communicate movement of the bellows. The free end of the lever carries an upwardly extending pair of vane engaging fingers, each having a sloped camming surface in contact with one of the split vanes. In the preferred embodiment, these fingers are carried on a bifurcated, generally Y-shaped arm and have generally sinusoidal shaped camming surfaces in order to engage the damper's vanes evenly and cause uniform and smooth movement thereof in response to expansion or contraction of the temperature-sensitive bellows.

As previously discussed, it is desirable to provide ventilation for enclosed spaces such as buildings or attics during at least a portion of the year. The present damper, where used in conjunction with a conventional turbine ventilator, provides such ventilation and additionally, and more importantly, provides an automatic control such that air flow is controllable in response to ambient air temperatures. This insures that adequate ventilation is provided when necessary, yet prevents the unwanted flow of air when the ambient temperature is below a preset level. Thus, heating costs are reduced since the system is closed during cold weather.

Because the totality of the damper assembly is contained within the air conduit, it is a feature of the invention that the damper is mountable in an existing duct line with no additional exterior space required. This feature is of particular benefit in areas where there is insufficient space for external controls or linkages.

Due to the completely automatic nature of the present damper assembly, no attention is required on the part of the homeowner. The damper operates automatically over the preselected temperature range, opening and closing in response to temperature changes, thus assuring even the most forgetful homeowner that proper ventilation is taking place. The fully automatic nature of the present damper assembly also eliminates the need for mechanical adjusting means such as the chains, levers and rods discussed previously. This allows the apparatus to be positioned at the most advantageous portion of the flow conduit with no necessity for providing access for any mechanical or manual adjusting means.

The preferred temperature-sensitive bellows power unit which causes the movement of the lever to effect opening and closing of the damper is of well known design. One feature of these units is that they can be manufactured to operate over a number of desirable temperature ranges. A bellows unit with the desired temperature sensitivity is chosen and installed in the assembly to cause the damper to open and close over the desired range. Abnormally low temperatures will not adversely affect the performance of such a power unit since once the temperature falls below the range of the bellows, further temperature decreases will have no effect. Abnormally high temperatures, on the other hand, do cause the bellows unit to continue to expand to some degree. However, with the preferred embodiment, this will not harm the damper mechanism of the present invention. The camming surfaces on the damper vane contacting fingers are so shaped as to slide over the face of the vanes once the vanes are in their fully opened position. Hence, the present damper assembly, unlike previously attempted automatic dampers, is efficient, reliable, unharmed by temperature fluctuations in excess of those designed for, completely automatic, capable of insertion into existing conduits, and low in cost.

BRIEF DESCRIPTION OF THE DRAWINGS

While the novel features of the present invention are set forth with particularity in the appended claims, the invention will be understood more fully and completely from the detailed description of a preferred embodiment as set forth hereinafter, and as seen in the accompanying drawings in which:

FIG. 1 is a schematic elevation view of a portion of a building with the ventilation system and automatic damper assembly in place;

FIG. 2 is a side elevation view of the automatic damper assembly of the present invention with a portion of the conduit removed;

FIG. 4 is an elevation view of a preferred shape of the vane engaging fingers;

DETAILED DESCRIPTION OF THE INVENTION

Figure 3:
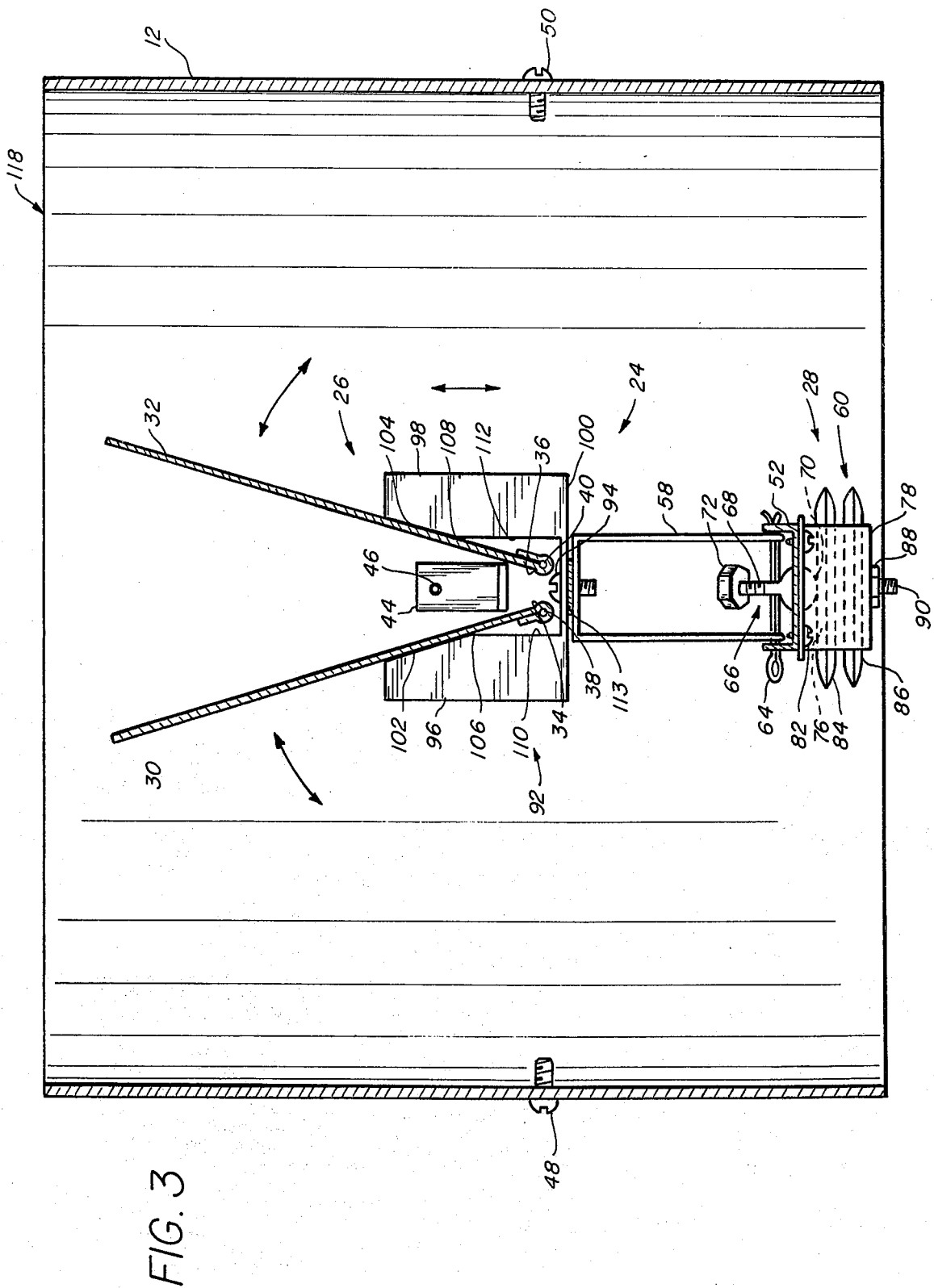
FIG. 3 is an end elevation view of the apparatus, partly in cross-section, taken along line 3—3 of FIG. 2.
Figure 5:
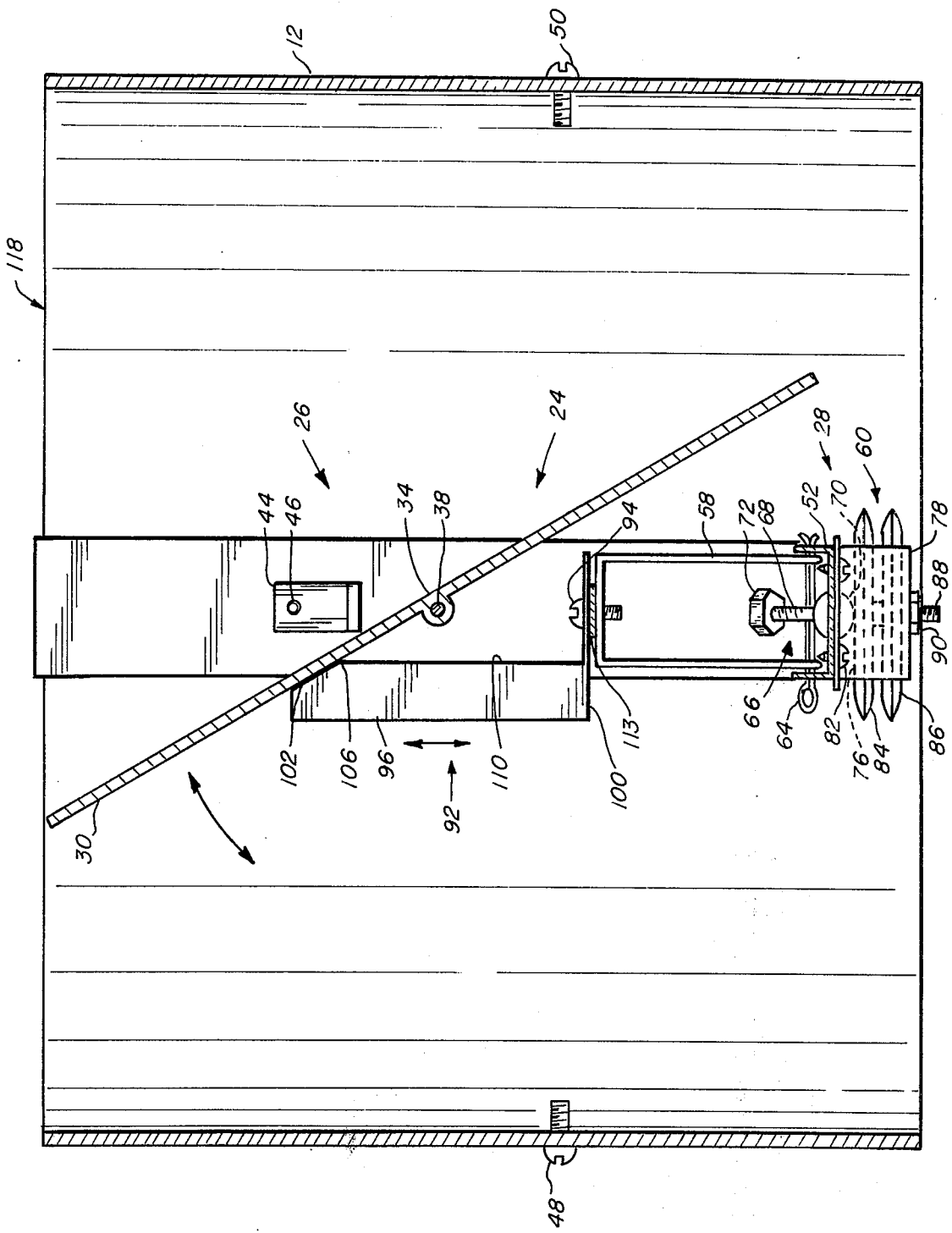
FIG. 5 is an end elevation view of the apparatus of the present invention, partly in cross section, illustrating the use of a solid disc-type damper rather than the split butterfly vane damper shown in FIG. 3.

Referring now to FIG. 1, there is shown generally at 10 a ventilation system utilizing a preferred embodiment of the automatic damper assembly of the present invention. As may be seen, system 10 is comprised of an air conducting conduit 12 passing through the roof 14 of a building 16. Conduit 12, which is provided with a suitable sealing means such as a roof jack generally indicated at 18 at its point of passage through roof 14, carries at its exterior portion, a turbine ventilator 20 of conventional construction. Since these ventilators are well known it will be sufficient to indicate that ventilator 20 is provided with a number of vertical slats 22 which cause the assembly to rotate under the influence of wind, and to act as an air pump. Conduit 12 carries, at an exterior portion thereof, an automatic, temperature actuated, damper assembly 24 in accordance with the present invention. Although damper assembly 24 is shown as being placed in conduit 12 exteriorly of roof 14 it may alternatively be placed interiorly thereof, if desired. While damper assembly 24 will hereinafter be described as being positioned in a circular air conduit 12, it will be understood that other similar conduit shapes such as square or rectangular may also be utilized with appropriate modifications being made to damper assembly 24.

As may be seen more completely in FIG. 2, damper assembly 24 is carried within a section of circular air conduit 12, such conduit being preferably of conventional galvanized sheet metal, with damper assembly 24 being comprised generally of a movable vane portion 26, and a temperature actuated vane opening and closing assembly 28.

Movable vane assembly 26, as seen in FIGS. 2 and 3, consists of a pair of movable vanes 30 and 32 with each such vane being in the shape of a semi-circular disc and being formed preferably of aluminum sheet metal. Each vane 30 and 32 is secured, along a diametral portion 34 and 36 respectively thereof, to a hinge rod 38 and 40 respectively. Each of these hinge rods 38, 40 pass generally through the center of conduit 12 and are free to rotate. Each hinge rod 38, 40 is provided, at its segment external to conduit 12, with a vane position indicator portion 42, such indicator being a flag or painted portion (not shown) or the like and serving to indicate the relative position of the vance carried by each such rod. Vanes 30 and 32 may be securely affixed to hinge rods 38 and 40 by any acceptable means such as screws (not shown) so long as vanes 30, 32 move with rods 38, 40. While, in the preferred embodiment, vanes 30 and 32 are shown as being separate and each carried by separate hinge rods 38 and 40 respectively, it will be understood that various other hinge means such as piano hinges and the like may be utilized and that both vanes may be hinged together so long as each vane is capable of pivotal movement about its diametral portion. Likewise, as will be evident to those skilled in this art, vanes 30 and 32 may be made to open downwardly, by such means as a reversal of the camming surfaces on the engageable fingers and location of the fingers radially inwardly from the hinges. Alternatively, a cam follower on the split vanes, and a slotted cam surface on the fingers, may be employed.

It is, of course, desirable to provide a means to assure that the vane stops when in its fully open or fully closed position. With reference again to FIG. 1, a vane stop piece 44 is affixed to the interior of conduit 12 by, for example, a screw 46. Vane stop 44 is positioned above hinge rods 38 and 40 and between vanes 30 and 32, as seen in FIG. 3, to insure that the vanes do not open past vertical, therby preventing the vanes from becoming stuck in their full open position. A means such a inwardly extending screws 48 and 50, as seen in FIG. 3, is also provided to insure that vanes 30 and 32 do not travel past a horizontal position when in their closed mode. Again, it will be understood that alternative vane stops may be utilized with, for example, piece 44 being replaced by spaced screws or the like and with screws 48 and 50 being replaced by inwardly extending lips or the like.

Automatic opening and closing of vanes 30 and 32 is, as previously indicated, afforded by temperature actuated vane opening and closing assembly 28. As illustrated in FIGS. 2 and 3, vane opening and closing assembly 28 is carried within conduit 12 and is disposed generally beneath vanes 30 and 32. A generally U-shaped, upwardly opening bracket 52 is positioned beneath hinge rods 38 and 40 and parallel thereto. This bracket, which is affixed, at its ends, to conduit 12 by any suitable means such as, for example, screws 54 and 56, carries thereon a movable vane actuating lever 58 and a temperature sensitive drive assembly 60, as will now be more fully discussed.

Vane actuating lever 58 which, as may be seen in FIGS. 2 and 3, is of generally channel shape, is pivotally connected at a first end 62 thereof to bracket 52, and has a free end 63. This pivotal connection may be of any conventional type and is shown in the preferred embodiment as being a conventional cotter pin 64 which passes through bracket 52 and lever 58. It will be noted that, as shown in FIG. 3, lever 58 is of slightly less width than is bracket 52 so that lever 58 will be capable of being disposed within bracket 52 when lever 58 is in its rest position.

Again as shown in FIGS. 2 and 3, an adjustable lever actuating leg 66 is carried by lever 58 adjacent the lever's pivoted end 62 and above the center of bellows assembly 60. In the preferred embodiment, leg 66 is shown as being comprised of a screw 68 provided with a rounded head 70 and two adjusting nuts 72 and 74 carried above and below the web portion of lever 58. Head 70 rides on an upper surface 76 of drive assembly 60, with screw 68 passing through a suitable aperture (not shown) in bracket 52 so that expansion or contraction of drive assembly 60 will cause movement of leg 66 and hence movement of lever 58. Since screw 66 is provided with adjusting nuts 72 and 74, the position of screw head 70 may be varied thereby varying the point at which leg 66 will be caused to move by expansion of drive assembly 60.

Drive assembly 60 is, as seen in FIGS. 2 and 3, carried by a supporting member 78 affixed to the underside of bracket 52. In the preferred embodiment shown, drive assembly 60 comprises a sealed bellows power drive unit of conventional design. The unit is filled with a heat expansible fluid, the volatility of which is matched along with the shell thickness, type of metal and volume of the unit, to provide a suitable expansion at the desired temperature range. In addition to being actuated suitable at the appropriate design temperatures, the power drive assembly of the present invention should also be capable of generating a force in the range of about 50–60 pounds per square inch in order to be operable to move the damper vanes. It will be understood that any of a number of temperature-sensitive power drive units may be utilized in assembly 60 so long as their expansion and contraction characteristics are predictable and the force generated is suitable over the desired temperature range.

A vane engaging arm 92 is carried at the free end 63 of lever 58, as may be seen in FIG. 2. Arm 92 is secured to lever 58 by any conventional means such as screws 94. As shown more clearly in FIGS. 3 and 4, arm 92 is comprised of two upwardly extending, spaced fingers 96 and 98 carried by a flat base plate 100. Fingers 96 and 98 have generally parallel inner edges 110 and 112 which are provided, at their upper inner edges, with sloped camming surfaces 102 and 104 respectively. These camming surfaces are so shaped that the space between fingers 96 and 98 increases with an increase in distance from flat base plate 100. Camming surfaces 102 and 104 terminate at points 106 and 108, respectively, spaced from the base plate 100 so that a constant space between edge portions 110 and 112 of the two fingers 96 and 98 is maintained over a portion of the length of the fingers adjacent flat base plate 100. This constant space is sufficient, as illustrated in FIGS. 3 and 4, to allow the passage of the diametral portions 34 and 36 of vanes 30 and 32 there between when the vanes approach a vertical position, as limited by stop 44. This insures that, even if lever 58 and hence fingers 96 and 98 move upwardly to a greater extent than planned due to abnormal temperatures, vanes 30 and 32 will pass between the fingers and will not be damaged. Should lever 58 and hence arm 92 move upwardly to an extent in excess of that necessary to fully open vanes 30 and 32, a flat spring 113, secured to the free end 63 of lever 58 and extending outwardly therefrom as may be seen in FIG. 2, will engage the diametral portions 34 and 36 of the vanes and will tend to force lever 58 downward.

Camming surfaces 102 and 104 are shown, in FIG. 3, as being of a constant slope, while in FIG. 4 they are shown at 114 and 116 as having a generally sinusoidal cross section. The constantly sloped surfaces of FIG. 3 provide essentially two points of contact, one at the ends of the fingers and one at points 106 and 108 for each of the vanes, the contact point shifting as the bellows moves through the intended temperature range. The sinusoidally curved camming surfaces of FIG. 4, on the other hand, provide a continually changing point of contact between each camming surface and its corresponding vane. This provides for a rapid initial opening with a subsequent reduction in vane opening rate due to the decreasing rate of change of slope of the camming surface. Additionally, the sinusoidal slope of the cam surface, by providing a point of contact which is farther from the vane's pivot point initially and thereafter moves inwardly during vane opening, produces a substantially constant vane opening force. This permits maximum efficiency in the use of the bellows movement and thus allows for the use of a smaller assembly. While either camming surface may be utilized, depending on the type of vane actuation desired, the sinusoidally curved shape of FIG. 4 is preferred.

Figure 7:
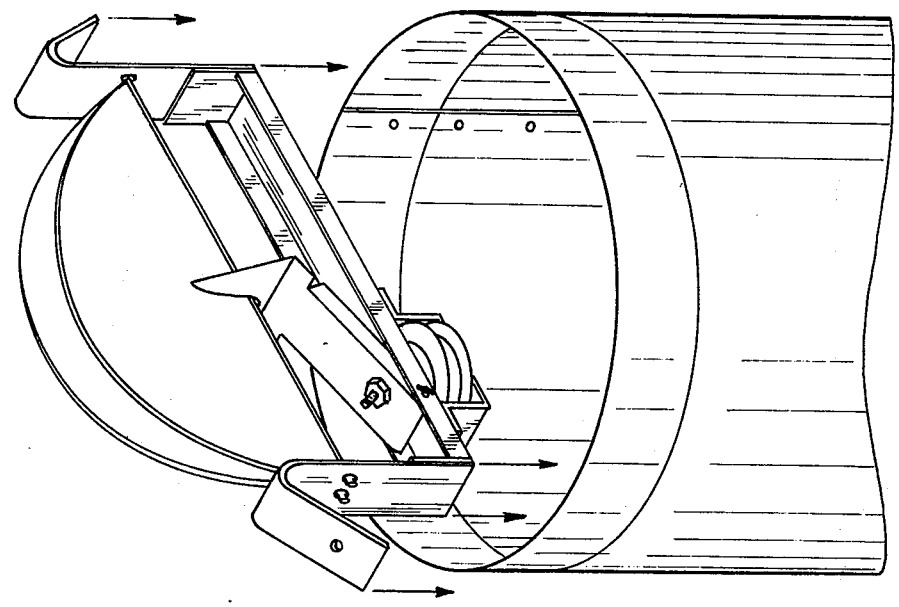
FIGS. 6 and 7 are perspective illustrations of solid disc vane and split butterfly vane damper assemblies, respectively, wherein the damper assembly of the invention is pre-mounted in an adjustable hanger brace for insertion and positioning inside the conduit without the requirement of additional conduit extensions.
Figure 6:
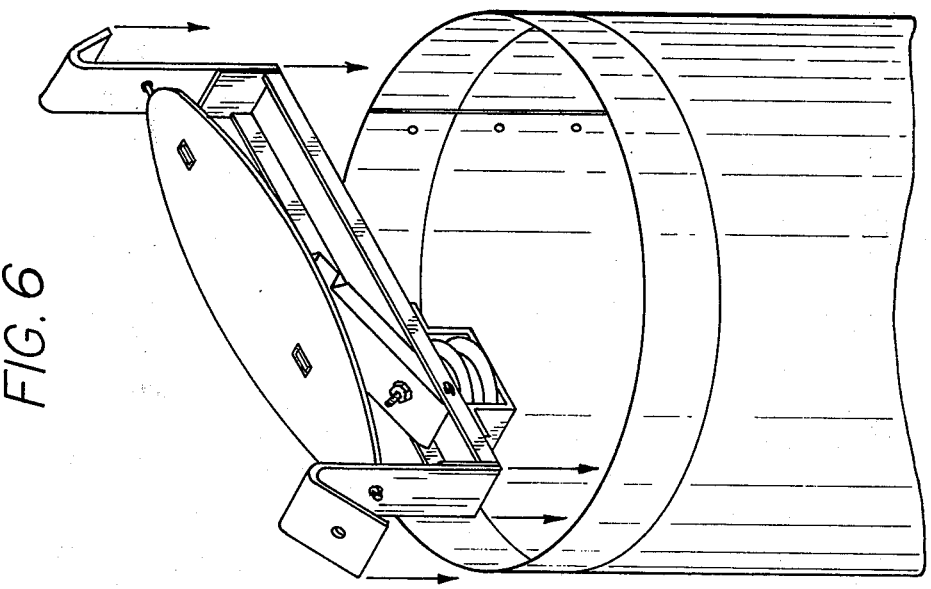

In operation, a bellows assembly 60, having predetermined expansion characteristics over the anticipated temperature range to be encountered, is selected and installed in the supporting member 78. The depth of member 78 is such that it limits the amount that bellows assembly 60 may expand as top surface 76 of assembly 60 will be limited in its upward movement by contact with the underside of bracket 52. This insures that assembly 60 will not be harmed by over-expansion due to excessively high temperatures, which might be encountered, for example, in shipping or in storage. The section of conduit 12 which carries the automatic damper assembly 24 is positioned in a desired location in the ventilation system with conduit section 12 being provided with corrugations 118 to facilitate such insertion. Alternatively, the damper assembly may be mounted directly in an existing conduit by utilizing an adjustable hanger brace such as is illustrated in FIGS. 6 and 7. As shown in FIGS. 6 and 7, the entirety of damper assembly 24 is mounted between support hangers 120 and 121. These support hangers are made of relatively light gauge metal which can be bent as suited to properly position the damper assembly.

The damper assembly 24 is so positioned that vanes 30, 32 are substantially horizontal when in their closed position. Leg 66 is adjusted to allow the vanes to close completely at the low end of the temperature range. As the ambient air temperature starts to rise through the preselected range, bellows assembly 60 expands, thereby forcing leg 66 upward, as shown in FIG. 2. Upward movement of leg 66 causes lever 58 to pivot about pivot point 64 and to raise its free end 63, thereby causing camming surfaces 102 and 104, carried by fingers 96 and 98, to engage vanes 30 and 32 forcing them to pivot open on hinge rods 38 and 40. As the temperature increases, the vanes continue to open until they are limited by engagement with stop 44. Further upward movement of lever 58 caused by temperatures in excess of the predetermined range will not adversly affect vanes 30 and 32 due to the uniform space maintained between the fingers.

As the ambient temperature decreases, bellows assembly 60 contracts thus causing lever 58 to lower and hence lowering vanes 30 and 32. Any tendancy of the vanes to stick in the open position is prevented by stop 44, and flat spring 113. Sticking may also, as a practical matter, be counteracted by the vibration caused in conduit 12 by the action of the turbine 20. The vanes continue to lower to their horizontal closed position where they may be held by screw stops 48 and 50, effectively preventing air flow through the conduit. Alternatively, screws 48 and 50 may be eliminated and the spacing between the vanes and lever 58 adjusted so that vanes 30 and 32 are horizontally supported by arm 92 when lever 58 is in its lowered position. A further decrease in the ambient temperature below the preselected range has no adverse effect on the damper assembly since it merely causes the bellows to contact contract until its limit is reached.

The foregoing description of the invention has been directed in primary part to a particular preferred embodiment in accordance with the requirements of the Patent Statutes and for purposes of explanation and illustration. It will be apparent, however, to those skilled in this art that many modifications and changes in the specific apparatus utilized may be made without departing from the scope and spirit of the invention. For example, as heretofore mentioned, the split butterfly vanes may be designed to open downwardly, as opposed to the upward opening illustrated in the preferred embodiment. Similarly, the shape of the conduit, and hence the shape of the vanes, may be varied. It should be evident also that the positioning of the assembly within the ventilating conduit may be accomplished either interiorly or exteriorly of the building roof. Further, with appropriate changes in the associated power communication means, electric thermocouples may be used in association with air, hydraulic or electric power driven assemblies to replace the bellows drive unit illustrated and utilized in the preferred embodiments. It is applicant's intention in the following claims to cover these and other equivalent modifications and variations as fall within the true spirit and scope of the invention.

The subject matter for which patent protection is claimed is:

1. An automatic temperature responsive damper assembly for use within the conduit of a ventilating system designed to exhaust the air in a confined space to the atmosphere whereby said conduit may be opened in order to minimize excess heat build up in said confined space and closed when it is desired to prevent heat loss from said confined space, said assembly comprising:
   at least one vane carried within said conduit and movable between a generally closed position and a generally open position;
   a temperature responsive drive assembly mounted to detect temperature changes in said conduit and adapted to actuate in response to temperature changes within a predetermined range;
   a lever arm positioned in said conduit and operatively connected between said drive assembly and said at least one vane to move said at least one vane in response to actuation of said drive assembly;
   said lever arm being provided at its distal end with a vane engageable finger having a camming surface for each vane, said camming surface adapted so as to move said at least one vane between its open and closed positions in response to actuation of said drive assembly and to permit slideable contact with said vane.

2. The apparatus of claim 1 wherein said at least one vane comprises a pair of pivoted split butterfly vanes movable about a substantially common axis, said axis lying generally in the center of said conduit.

3. The apparatus of claim 1 wherein said drive assembly is a fluid-containing bellows unit capable of expanding and contracting in response to temperature changes between predetermined limits and to generate a force equivalent to about 50 to about 60 pounds per square inch at the upper limit of said predetermined range.

4. The apparatus of claim 3 wherein said drive assembly is mounted adjacent to said at least one vane and wherein said damper assembly further comprises a communication leg adjustably secured to the lever arm adjacent the pivot end thereof and engaging said bellows unit so as to communicate movement of said bellows to said lever arm.

5. The apparatus of claim 1 wherein said camming surfaces are sinusoidal in shape.

6. An automatic temperature responsive damper assembly for use within the conduit of a roof top ventilator, said assembly comprising:
- at least one movable vane pivotably mounted within said conduit and operable between a fully closed and a fully open position to control the upward passage of air through said conduit; and
- a temperature actuated drive assembly operably connected to move said at least one vane between its fully closed and fully open positions in response to temperature changes in said conduit;
- said temperature actuated drive assembly comprising a temperature responsive drive means positioned inside said conduit and movable in response to temperature changes upstream from said at least one movable vane;
- lever means pivotably mounted within said conduit and positioned to move in response to movement of said drive means and camming means in association with the distal end of said lever arm to communicate the movement of said lever means to said at least one movable vane in order to move said vane to an open or a closed position.

* * * * *